(12) United States Patent
Hatahori et al.

(10) Patent No.: US 10,942,152 B2
(45) Date of Patent: Mar. 9, 2021

(54) DEFECT INSPECTION DEVICE AND METHOD

(71) Applicant: Shimadzu Corporation, Kyoto (JP)

(72) Inventors: Takahide Hatahori, Kyoto (JP); Yuya Nagata, Kyoto (JP); Kenji Takubo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 307 days.

(21) Appl. No.: 16/311,839

(22) PCT Filed: Jun. 21, 2016

(86) PCT No.: PCT/JP2016/068387
§ 371 (c)(1),
(2) Date: Dec. 20, 2018

(87) PCT Pub. No.: WO2017/221324
PCT Pub. Date: Dec. 28, 2017

(65) Prior Publication Data
US 2019/0204275 A1   Jul. 4, 2019

(51) Int. Cl.
*G01N 29/06* (2006.01)
*G01N 29/24* (2006.01)
(Continued)

(52) U.S. Cl.
CPC ....... *G01N 29/069* (2013.01); *G01B 9/02098* (2013.01); *G01H 3/125* (2013.01);
(Continued)

(58) Field of Classification Search
CPC ............... G01N 29/00; G01N 21/8806; G01N 21/1702; G01N 2021/1706;
(Continued)

(56) References Cited

U.S. PATENT DOCUMENTS 5,585,921 A * 12/1996 Pepper ................. G01N 29/075
356/432
7,027,353 B2 * 4/2006 Melese ................ A61B 5/0071
367/7
(Continued)

FOREIGN PATENT DOCUMENTS

JP  2006-300634 A   11/2006
JP  4595117 B       12/2010
(Continued)

OTHER PUBLICATIONS

English translation of Written Opinion dated Sep. 6, 2016 of corresponding application No. PCT/JP2016/068387; 4 pgs.
(Continued)

*Primary Examiner* — John Fitzgerald
*Assistant Examiner* — Truong D Phan
(74) *Attorney, Agent, or Firm* — Maier & Maier, PLLC (57) ABSTRACT

The defect inspection device is provided with a sound wave excitation unit for exciting a sound wave having a time waveform represented by a continuous periodic function to a prescribed position on the surface of an object to be measured, a displacement amount measurement unit for measuring a periodically varying displacement amount generated by the propagation of the sound wave from the prescribed position through the surface at at least three different phases of the periodic variation, and a periodic function acquisition unit for determining a periodic function expressing the periodic variation of the physical quantity on the basis of the displacement amount at the at least three different phases.

8 Claims, 5 Drawing Sheets

(51) Int. Cl.
| | |
|---|---|
| *G01N 29/34* | (2006.01) |
| *G01N 29/04* | (2006.01) |
| *G01N 29/44* | (2006.01) |
| *G01N 29/36* | (2006.01) |
| *G01H 3/12* | (2006.01) |
| *G01B 9/02* | (2006.01) |
| *G01H 9/00* | (2006.01) |

(52) U.S. Cl.
CPC .......... *G01H 9/002* (2013.01); *G01N 29/043* (2013.01); *G01N 29/0654* (2013.01); *G01N 29/2418* (2013.01); *G01N 29/345* (2013.01); *G01N 29/36* (2013.01); *G01N 29/4472* (2013.01); *G01N 2291/0289* (2013.01); *G01N 2291/263* (2013.01)

(58) Field of Classification Search
CPC . G01N 2201/06113; G01N 2201/8838; G01N 2201/0697; G01N 29/043; G01N 29/2418; G01N 21/45; G01N 21/88; G01N 2021/1729; G01N 21/8851; G01N 29/069; G01N 29/345; G01N 29/4472; G01N 2291/0289; G01N 29/06; G01B 9/02095; G01B 9/02098; G01H 9/002
See application file for complete search history.

(56) References Cited

U.S. PATENT DOCUMENTS

| | | | | |
|---|---|---|---|---|
| 7,262,861 B1 * | 8/2007 | Pepper | ................... | G01B 11/06 356/502 |
| 7,474,411 B2 * | 1/2009 | Dubois | ................... | G01H 9/00 356/502 |
| 8,555,725 B2 * | 10/2013 | Brandt | ................... | G01N 29/12 73/643 |
| 10,267,618 B2 * | 4/2019 | Hatahori | ................ | G01M 7/00 |
| 10,429,172 B2 * | 10/2019 | Hatahori | ........... | G01B 9/02095 |

FOREIGN PATENT DOCUMENTS

| | | |
|---|---|---|
| JP | 2011-257163 A | 12/2011 |
| JP | 2014-119441 A | 6/2014 |
| JP | 2015-92914 A | 5/2015 |

OTHER PUBLICATIONS

International Preliminary Report on Patentaability dated Dec. 25, 2018 of corresponding application No. PCT/JP2016/068387; 5 pgs.
International Search Report including English translation and Written Opinion including machine translation dated Sep. 6, 2016 of corresponding application No. PCT/JP2016/068387; 8 pgs.
Ichiro Yamaguchi, "Measurement of shape and deformation by phase shift digital holography", Experimental mechanics, vol. 1 (2001), No. 4, p. 191-196, 6 pgs.
Toru Yoshizawa, Kengo Suzuki, "Automatic measurement of three-dimensional shape by grid pattern projection", Journal of Precision Engineering, vol. 53 (1987), No. 3, p. 422-426, 5 pgs.
Lee Zhi-do, Wang Qing Hua, Arikawa Shuichi, Yoneyama Satoshi "Comparative study of digital image correlation method and sampling moiré method in in-plane displacement distribution measurement", Experimental mechanics, vol. 15 (2015), No. 4, p. 303-308, 6 pgs.

* cited by examiner

DEFECT INSPECTION DEVICE AND METHOD

FIELD

The present invention relates to a device and method for visualizing a sound wave propagating through a surface of an object to be measured.

BACKGROUND

One of methods for analyzing a state (a defect and the like) on the surface or inside of an object such as a concrete or steel structure in a non-contact manner, there is a method using a sound wave. When the sound wave is applied to one point on the surface of the object, the sound wave propagates through the surface and inside of the object. At this time, a mode in which the sound wave propagates through the surface or inside of the object reflects the state (for example, the presence or absence of the defect) of the surface or inside of the object. Accordingly, it is possible to analyze the state of the surface and the inside of the object by measuring a speed and direction at which the sound wave propagates through a surface of the object, continuity of the sound wave, and the like (for example, PTL 1).

Figure 1:
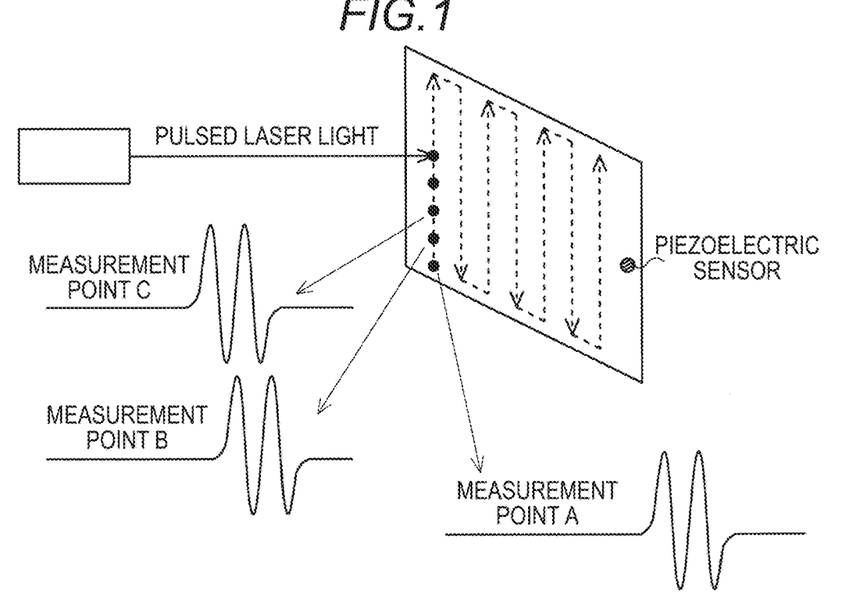
FIG. 1 is a diagram for explaining a sound-wave-propagation visualization device of the related art.

In the sound-wave-propagation visualization device described in PTL 1, as illustrated in FIG. 1, a piezoelectric sensor is attached to a predetermined one place (measurement point) on the surface of the object, and the surface of the object is sequentially irradiated with pulsed laser light to thereby scan a predetermined range of the surface of the object. Then, intensity of thermal excitation vibration generated at each irradiation point in the predetermined range is detected by the piezoelectric sensor and converted into data. Since there is reversibility (symmetry) in propagation characteristics of vibrations (sound waves) between two points in the object, moving pictures (videos) representing a state of vibration in the predetermined range can be obtained by handling vibration data from each irradiation point to a measurement point as vibration data from the measurement point to each irradiation point. From the video of vibration propagation obtained in this way, the user can analyze the state of the surface and the inside of the object.

[PTL 1] JP-A-2006-300634
[NPL 1] Ichiro Yamaguchi, "Measurement of shape and deformation by phase shift digital holography", Experimental mechanics, Vol. 1 (2001), No. 4, p. 191-196
[NPL 2] Toru Yoshizawa, Kengo Suzuki, "Automatic measurement of three-dimensional shape by grid pattern projection", Journal of Precision Engineering, Vol. 53 (1987), No. 3, p. 422-426
[NPL 3] Lee Zhi-do, Wang Qing Hua, Arikawa Shuichi, Yoneyama Satoshi "Comparative study of digital image correlation method and sampling moiré method in in-plane displacement distribution measurement", Experimental mechanics, Vol. 15 (2015), No. 4, p. 303-308

SUMMARY

In the related art, a pulse wave was used as a sound wave to be applied to an object. In this case, in order to capture the state of vibration of the entire visual field to be measured, it was necessary to perform sampling over a time period during which the pulse wave including a reflected wave traverses the entire visual field. In order to display the sound wave as a continuous propagation video, there is a problem that a sufficient number of sampling is required for a frequency and propagation speed of the sound wave, and an amount of data to be measured increases.

An object to be achieved by the present invention is to provide a sound-wave-propagation visualization device and method capable of obtaining a continuous sound wave propagation video from a small number of sampling.

A sound-wave-propagation visualization device according to the present invention made to achieve the object described above includes a) a sound wave application unit for applying a sound wave having a time waveform represented by a continuous periodic function to a prescribed position on a surface of an object to be measured, b) a physical quantity measurement unit for measuring a periodically varying physical quantity generated by propagation of the sound wave from a prescribed position on the surface at at least three different phases of periodic variation, and c) a periodic function acquisition unit for obtaining a periodic function expressing the periodic variation of the physical quantity on the basis of the physical quantity at the at least three different phases.

The physical quantity is, for example, sound pressure, displacement, velocity, or acceleration, or spatial differential, time differential, spatial difference, or time difference of the physical quantities. Measurement of the physical quantity can be performed by mechanical measurement using a microphone, a piezoelectric element or the like, optical measurement for measuring reflected light modulated by the sound wave by irradiating a predetermined range on the surface of the object with light.

In the sound-wave-propagation visualization device according to the present invention, a sound wave whose time waveform is represented by a continuous periodic function is applied to a prescribed position (for example, an end portion) on the surface of the object to be measured. This can be implemented, for example, by attaching a piezoelectric element to one place on the surface and applying the sound wave whose time waveform is represented by a continuous periodic function. As the sound wave whose time waveform is represented by the continuous periodic function, for example, a sound wave that varies in a sinusoidal wave form can be used, and the sound wave that contains one or more harmonic components may be used.

When the sound wave propagates throughout the entire measurement visual field of the object, the physical quantity fluctuates at the same period as the sound wave at each position on the surface of the object in the measurement visual field. The physical quantity measurement unit obtains three or more different phase time points from a fluctuation period (that is, a period of the sound wave) of the physical quantity and measures the physical quantity at each position of the surface of the object at these phase time points. For example, when description is made on a case of measuring the physical quantity at the phase time points where the phase is 0, $2\pi/3$, $4\pi/3$, since the physical quantity fluctuates periodically at each position on the surface of the object, it is not necessary to perform these three measurements in one period, and it suffices to measure repeatedly occurring variation of physical quantity three times (for example, in three periods) with different phases. Accordingly, even in a case where the frequency and the propagation speed are large, the physical quantity can be reliably measured. Then, from values of the physical quantities at the three different phases obtained by the measurement, a periodic function representing variation of the physical quantity at each position on the surface of the object is obtained.

When the periodic function is obtained in this way, values of the physical quantity can be obtained at desired phase intervals. Images are created by converting the values of the physical quantity obtained at the desired phase intervals using the periodic function to luminance (shade) or color and the created images are consecutively displayed by arranging the images side by side in order of the phase time, thereby capable of creating propagation videos of sound waves with continuity. The term "phase time" as used herein means that the time axis is prescribed by phase.

The sound-wave-propagation visualization device according to the present invention can further adopt a configuration including d) a physical quantity calculation unit for obtaining values of the physical quantity at predetermined phase intervals by using the periodic function, and e) a visualization unit for visualizing the propagation of sound waves on the surface by using the values of the physical quantity obtained by the physical quantity calculation unit. In the sound-wave-propagation visualization device of this embodiment, it is possible to automatically perform calculation and visualization of the physical quantity, and it is possible to more easily obtain propagation video of the sound waves.

In the sound-wave-propagation visualization device according to the present invention, in a case where the sound wave applied to the object from the sound wave application unit has a single frequency component, the physical quantity measurement unit may have at least three phases for measuring the physical quantity, but harmonics may be generated depending on the state of the surface of the object. Further, a defective portion such as an internal cavity of the object may have an inherent resonance frequency, and it is possible to effectively detect the defective portion by applying a sound wave within a band in the vicinity of the resonant frequency. However, since this resonance frequency is not normally clear at a stage before the measurement, in order to effectively detect the defective portion, it is necessary to search for the resonance frequency by applying sound waves of a plurality of frequencies. At this time, by including harmonic components in the sound waves to be applied to the object from the sound wave application unit, sound waves of the plurality of frequencies can be simultaneously applied to the object. In these cases, since the harmonic component is contained in periodic fluctuation of the physical quantity, it is preferable that the physical quantity measurement unit measures the physical quantity at $2n+1$ or more phases (n is an integer of 2 or more) different from each other. With this configuration, it is possible to capture periodic variation in the physical quantity of the n-th harmonic component.

In the sound-wave-propagation visualization device according to the present invention, the physical quantity to be measured can be obtained by optical measurement. That is, the physical quantity measurement unit can be configured to include a light irradiation unit that irradiates a region to be measured on the surface with light and a light measurement unit that measures an intensity distribution of light reflected on the region to be measured.

In the aspect described above, it is particularly preferable to adopt a configuration in which a differential interference speckle imaging optical system is included. In this case, the physical quantity to be measured is a spatial difference of displacement of the surface of the object. In the optical system of differential interference speckle imaging (also called a shearography), light from the surface of the object is divided into two, a slight angular difference is applied between the divided light fluxes, and then an image is formed, thereby capable of obtaining a differential interference image of a speckle image (an image in which speckles are superimposed on a surface of the object image). Then, by measuring variation in light intensity at each pixel of the differential interference image while varying an optical path length difference between the two light fluxes, it is possible to obtain a phase difference of light coming from two points on the surface of the object projected on each pixel (phase shift method, NPL 1).

A sound-wave-propagation visualization method according to the present invention made to solve the problem described above includes a) applying a sound wave having a time waveform represented by a continuous periodic function to a prescribed position on a surface of an object to be measured, b) measuring a periodically varying physical quantity generated by propagation of the sound wave from the prescribed position through the surface at at least three different phases of the periodic variation, c) obtaining a periodic function expressing a periodic variation of the physical quantity on the basis of the physical quantity at the at least three different phases, d) obtaining values of the physical quantity at predetermined phase intervals by using the periodic function, and e) visualizing the propagation of sound waves on the surface by using the values of the physical quantity obtained by the physical quantity calculation unit.

By using the sound-wave-propagation visualization device or method according to the present invention, it is possible to obtain propagation video of sound waves having sufficient continuity for analysis from a small number of sampling.

DETAILED DESCRIPTION

An embodiment of a sound-wave-propagation visualization device and method according to the present invention will be described with reference to FIGS. 2 to 8.

Figure 2:
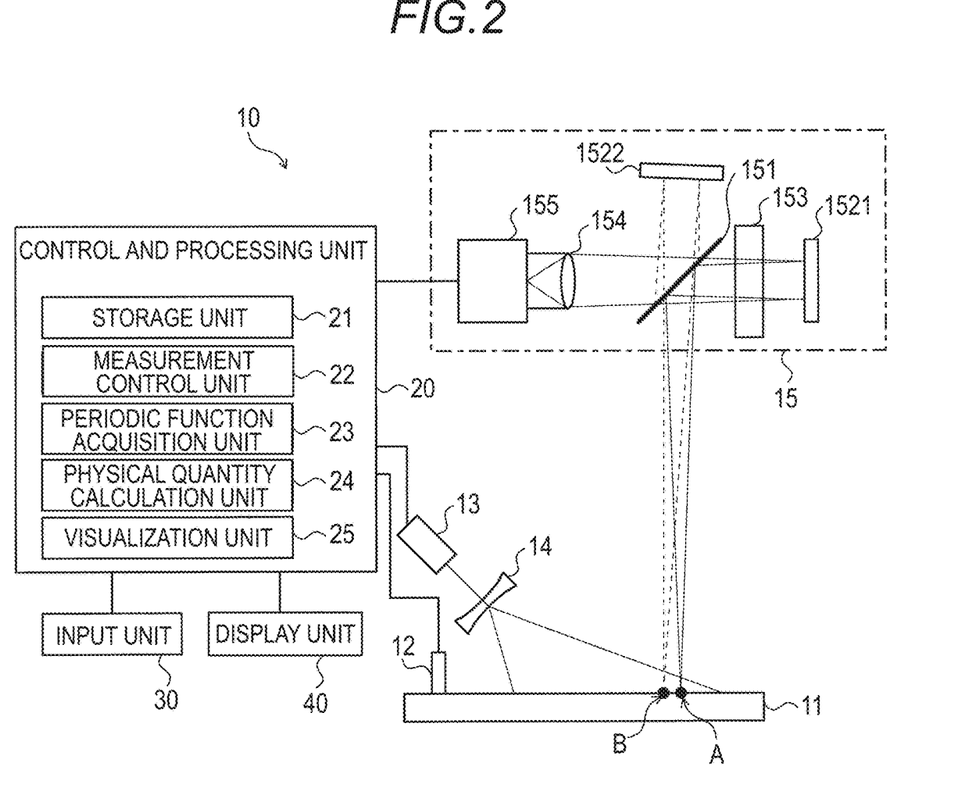
FIG. 2 is a configuration diagram of a main part of an embodiment of a sound-wave-propagation visualization device according to the present invention.

FIG. 2 is a schematic configuration diagram of a sound-wave-propagation visualization device 10 of the present embodiment. The sound-wave-propagation visualization device 10 is a device for inspecting a defect on the surface and the like by visualizing propagation of a sound wave on the surface of an object 11 to be measured and includes a piezoelectric element 12, a pulse laser light source 13, an illumination light lens 14, a speckle shearing interferometer 15, and a control and processing unit 20.

In addition to a storage unit 21, the control and processing unit 20 includes a measurement control unit 22, a periodic function acquisition unit 23, a physical quantity calculation unit 24, and a visualization unit 25 as functional blocks. The entity of the control and processing unit 20 is a general computer, and each function block described above is implemented by executing a predetermined program by the CPU of the computer. An input unit 30 and a display unit 40 are connected to the control and processing unit 20. One to a plurality of periodic functions and preset phase interval information are stored in the storage unit 21. These will be described later.

When the user instructs a measurement start of the object 11 to be measured by a predetermined operation, the measurement control unit 22 reads the periodic function from the storage unit 21. In a case where a plurality of periodic functions are stored in the storage unit 21, the user is caused to select a periodic function to be used for measurement.

Upon determining the periodic function, the measurement control unit 22 generates an AC signal whose amplitude varies according to the periodic function, amplifies the signal by an amplifier (not illustrated), and transmits the signal to the piezoelectric element 12. The piezoelectric element 12 converts the received AC electrical signal into mechanical vibration, and applies mechanical vibration to an attachment position (for example, surface end portion) of the object 11 to be measured. With this configuration, a sound wave is generated at the attachment position of the piezoelectric element 12 of the object 11 to be measured, and periodic fluctuation of the physical quantity (for example, sound pressure fluctuation in which intensity change is represented by a sine wave) is generated by the generated sound wave. The measurement control unit 22 and the piezoelectric element 12 correspond to a sound wave application unit in the present invention.

The sound wave generated in the object 11 to be measured by the piezoelectric element 12 propagates throughout the entire surface and reaches a steady state where the physical quantity at each point on a surface of a sample fluctuates at the same period as the periodic function.

When fluctuation of the physical quantity at each position on the surface of the sample reaches the steady state, the measurement control unit 22 transmits a pulse-shaped electric signal (pulse signal) to the pulse laser light source 13 at the timing when the AC electric signal becomes a predetermined phase. The predetermined phase will be described later.

The pulse laser light source 13 is a light source that outputs pulsed laser light when receiving a pulse signal from the measurement control unit 22. Light emitted from the pulse laser light source 13 is magnified by the illumination light lens 14 which is a concave lens and the entire measurement range of the surface of the object 11 to be measured is irradiated with the light. The light irradiated on the surface of the object 11 to be measured is modulated by the sound wave at each point and reflected, and is measured by the speckle shearing interferometer 15.

The speckle shearing interferometer 15 corresponds to the physical quantity measurement unit in the present invention, and includes a beam splitter 151, a first reflecting mirror 1521, a second reflecting mirror 1522, a phase shifter 153, and an image sensor 155. A condensing lens 154 is provided at an incident portion of the image sensor 155. The beam splitter 151 is a half mirror disposed at a position where illumination light reflected from a measurement region on the surface of the object 11 to be measured is incident. A first reflecting mirror 1521 is disposed on an optical path of illumination light reflected by the beam splitter 151 and a second reflecting mirror 1522 is disposed on an optical path of illuminating light transmitted through the beam splitter 151. The phase shifter 153 is disposed between the beam splitter 151 and the first reflecting mirror 1521, and varies (shifts) the phase of the light passing through the phase shifter 153. The image sensor 155 is disposed on the optical path of the illumination light that is reflected by the beam splitter 151 and then reflected by the first reflecting mirror 1521 and transmitted through the beam splitter 151, and the illumination light that is transmitted through the beam splitter 151 and then reflected by the second reflecting mirror 1522 and reflected by the beam splitter 151.

The first reflecting mirror 1521 is disposed so that its reflecting surface is at an angle of 45° with respect to a reflecting surface of the beam splitter 151. In contrast, the second reflecting mirror 1522 is disposed so that its reflecting surface is at an angle slightly inclined from 45° with respect to the reflecting surface of the beam splitter 151. By disposition of the first reflecting mirror 1521 and the second reflecting mirror 1522, in the image sensor 155, irradiation light (solid line in FIG. 2) reflected at a certain point A on the surface of the object 11 to be measured and reflected by the first reflecting mirror 1521 reflected by the first reflecting mirror 1521 and irradiation light (broken line in the same figure) reflected at a point B slightly shifted from the point A on the surface and reflected by the second reflecting mirror 1522 are incident on the same position of the image sensor 155 and interfere with each other. In the image sensor 155, a large number of detection elements are two-dimensionally provided and light incident on the image sensor 155 through the first reflecting mirror 1521 and the phase shifter 153 from a large number of points (points A described above) on the surface of the object 11 to be measured is detected by detection elements different from each other. Similarly for the point B, light incident on the image sensor 155 through the second reflecting mirror 1522 from a large number of points is detected by detection elements different from each other.

Figure 3:
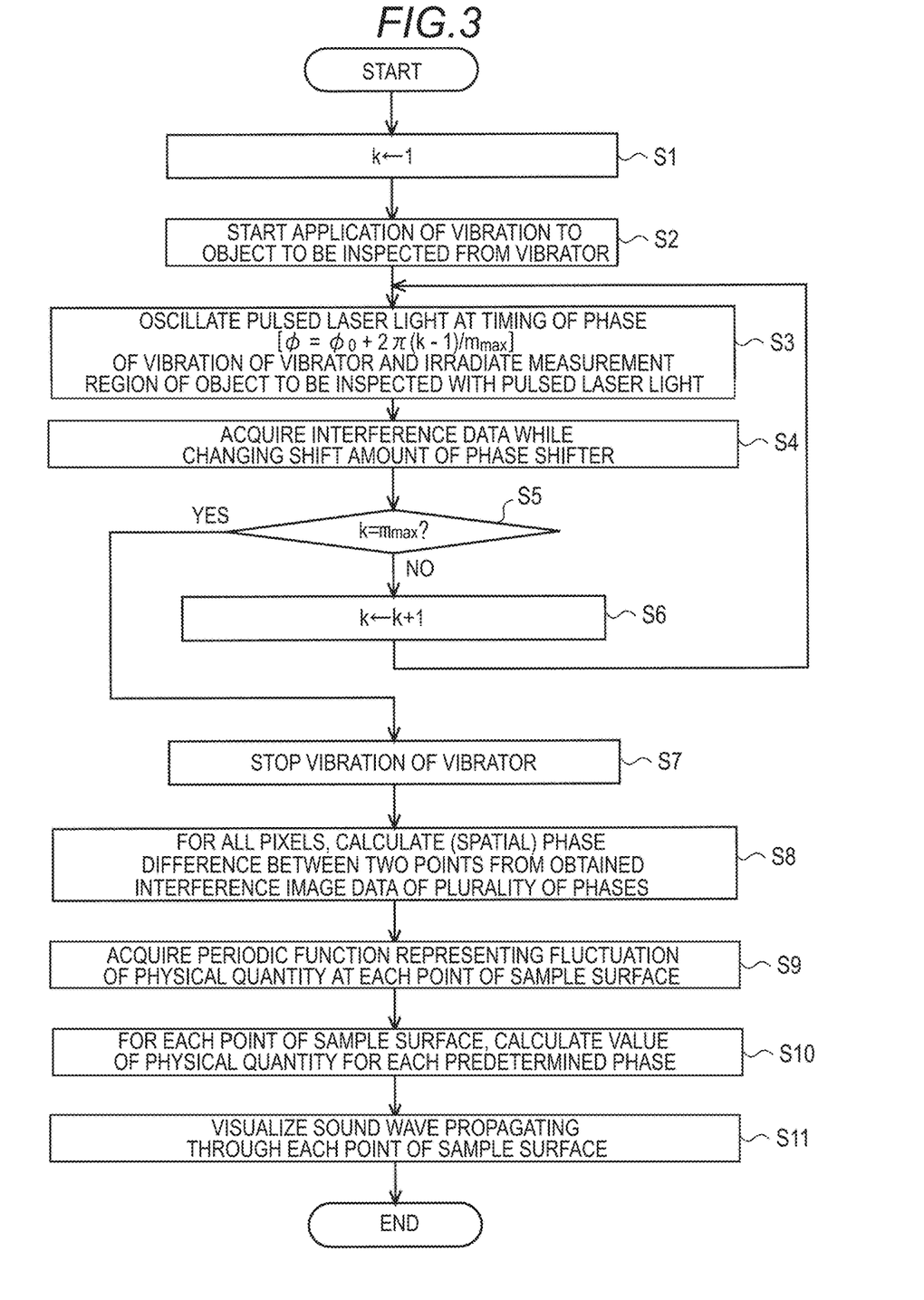
FIG. 3 is a flowchart illustrating a procedure in an embodiment of a sound-wave-propagation visualization method according to the invention.

Hereinafter, a procedure of processing in an embodiment of the sound-wave-propagation visualization method according to the present invention will be described using a flowchart of FIG. 3 and a graph of FIG. 4. In the present embodiment, measurement of surface displacement in which phase displacement (phase time) of vibration of the piezoelectric element 12 is different is performed $m_{max} \geq 3$ times. Here, the "phase of vibration of the piezoelectric element 12" is the phase of the AC electrical signal transmitted from the measurement control unit 22 to the piezoelectric element 12, and corresponds to a phase (phase time) at the attachment position of the piezoelectric element 12 of the sound wave excited in the object 11 to be measured. In the following, the measurement of the surface displacement of each time is represented as "k-th measurement" by using a numerical value k (any natural number between 1 and $m_{max}$). In the following description, first, as the most simple example, all steps for a case of $m_{max}=3$ will be described, and then a case where $m_{max}$ is a larger number will be described.

First, an initial value of k is set to 1 (Step S1), and application of vibration to the object 11 to be measured from the piezoelectric element 12 is started (Step S2) by transmitting an AC electric signal from the measurement control unit 22 to the piezoelectric element 12. With this configuration, a sound wave is excited in the object 11 to be measured. After a certain period of time has elapsed after exciting the sound wave, the physical quantity at each point on the surface of the object 11 to be measured is in a steady state represented by a periodic function as expressed by the following equation, for example.

$$f(x, t) = A(x)\cos\left(\frac{2\pi t}{T} + \varphi(x)\right) + B(x)$$

Here, x is the coordinate of each point, t is the time, A(x) is the amplitude at the coordinate x, B(x) is the central value (DC component) of the fluctuation of the physical quantity at the coordinate x, T is the period, and Φ(x) is the initial phase (phase at t=0) at x.

Next, for each timing at which the phase of vibration of the piezoelectric element 12 is represented by [ϕ$_0$+2π(k−1)/m$_{max}$] using a predetermined initial value ϕ$_0$ (for example, ϕ$_0$=0), the measurement control unit 22 transmits a pulse signal to the pulse laser light source 13. Since k=1 at this stage, the phase of vibration of the piezoelectric element 12 when the pulse signal is transmitted is ϕ$_0$. The pulse laser light source 13 repeatedly outputs illumination light which is the pulsed laser light each time the pulse laser light source 13 receives the pulse signal. The diameter of this illumination light is expanded by an illumination light lens 14 and the entire measurement region on the surface of the object 11 to be measured is irradiated with the illumination light (Step S3). That is, the object 11 to be measured is illuminated by a stroboscope at a timing synchronized with the period of the sound wave.

The illumination light is modulated by the sound wave on the surface of the object 11 to be measured and then reflected, and is incident on the beam splitter 151 of the speckle shearing interferometer 15. A part of the illumination light is reflected by the beam splitter 151, passes through the phase shifter 153 and then reflected by the first reflecting mirror 1521, passes through the phase shifter 153 again and then a part of the illumination light passes through the beam splitter 151, and incidents on the image sensor 155. The remainder of the illumination light incident on the beam splitter 151 is transmitted through the beam splitter 151 and reflected by the second reflecting mirror 1522, and a part thereof is reflected by the beam splitter 151 and is incident on the image sensor 155. As described above, the image sensor 155 detects irradiation light reflected from the large number of points on the surface of the object 11 to be measured with detection elements different from each other.

While the illumination light which is the pulsed laser light is being output repeatedly, the phase shifter 153 varies (shifts) the phase (spatial phase) of the irradiation light (that is, irradiation light reflected at the point A) passing through the phase shifter 153. With this configuration, a phase difference between the irradiation light reflected at the point A and the irradiation light reflected at the point B varies, and during each variation, each detection element of the image sensor 155 detects intensity of interference light obtained by interference between two irradiation light beams (Step S4). FIG. 4(a) graphically illustrates an example of an amount of phase shift by the phase shifter 153 obtained when the phase (phase time) of vibration of the piezoelectric element 12 is ϕ$_0$ and intensity of the interference light detected by the detection element of the image sensor 155. Then, the (spatial) phase difference between the point A and the point B can be obtained from the phase shift amount in the phase shifter 153 when the intensity of the interference light becomes the maximum. Alternatively, the (spatial) phase difference between the point A and the point B can be obtained by obtaining the intensity of the interference light at three different (spatial) phases. In FIG. 4, although a relationship in which the detected intensity varies sinusoidally with respect to the amount of phase shift is illustrated by a continuous curve, what is actually observed is discrete data, and the continuous sinusoidal waveform described above is reproduced from the observed data by least squares method or the like. For that purpose, it is necessary to detect the intensity with at least three different phase shift amounts.

Subsequently, in Step S5, it is checked whether or not the value of k has reached m$_{max}$. At this stage, since it is still k=1 and m$_{max}$ (3 in this example) has not been reached, determination at Step S5 is "NO". When the determination is "NO", processing proceeds to Step S6, where the value of k is incremented by 1 to be "2" (the case where the determination in Step S5 is "YES" will be described later).

Next, the processing is returned to Step S3, and at every timing when k=2 when the phase of vibration of the piezoelectric element 12 is [ϕ$_0$+2π(k−1)/m$_{max}$], that is, [ϕ$_0$+2π/3]≅ϕ$_1$, the control unit 22 transmits a pulse signal to the pulse laser light source 13, and the pulse laser light source 13 repeatedly irradiates the surface of the object 11 to be measured with the illumination light which is the pulsed laser light at the timing of receiving the pulse signal. Then, while varying (shifting) the phase of the irradiation light reflected at the point A by the phase shifter 153 to at least three values, each detection element of the image sensor 155 detects the intensity of the interference light of the irradiation light reflected at the point A and passes through the phase shifter 153 and the like and the irradiation light reflected at the point B (Step S4).

Figure 4:
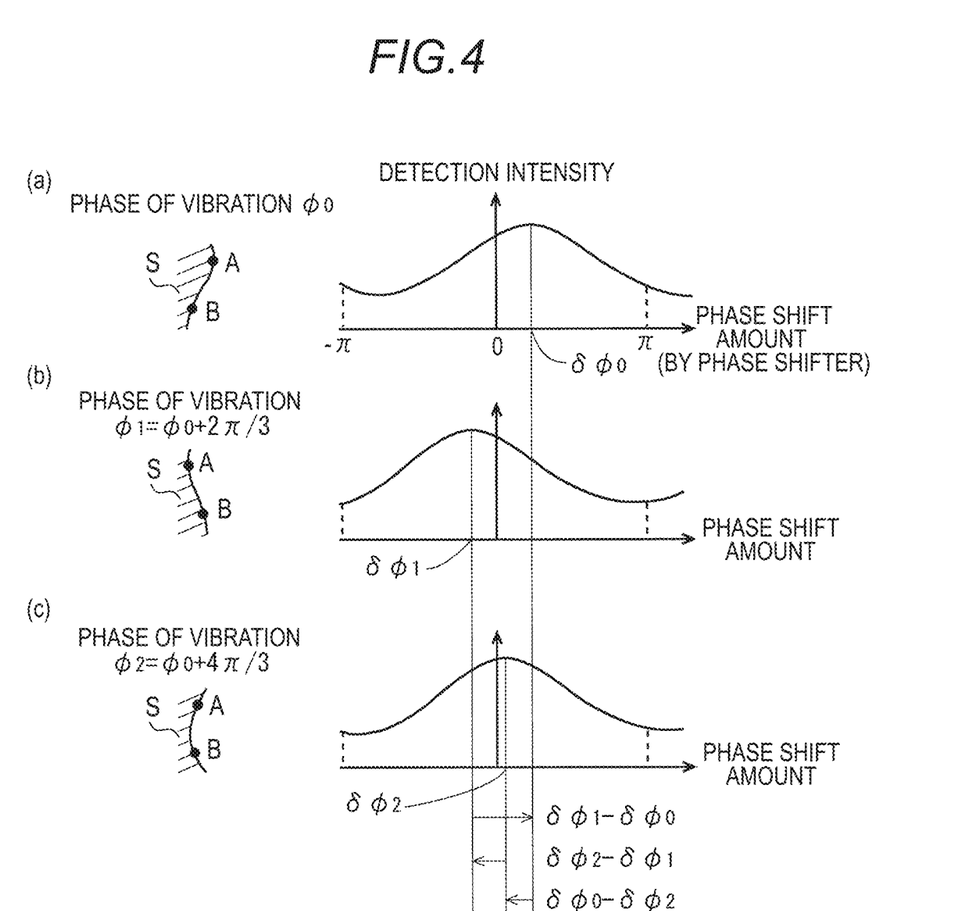
FIG. 4 is a graph for explaining the principle of sound wave propagation visualization technology used in the present embodiment.

FIG. 4(b) graphically illustrates an amount of phase shift by the phase shifter 153 obtained when the phase of vibration of the piezoelectric element 12 is ϕ$_1$ and the intensity of the interference light detected by the detection element of the image sensor 155. When FIG. 4(b) is compared with FIG. 4(a) described above, the peak position of the intensity of the interference light deviates by δϕ$_1$-δϕ$_0$ in both figures. This deviation indicates that the phase difference between the optical path from the point A and the optical path from the point B has varied due to difference in the phase of the vibration of the piezoelectric element 12 at the time of detection. The variation in the phase difference of the optical paths indicates that relative displacement of the points A and B in an out-of-plane direction varies.

After executing an operation of Step S4 at k=2 in this manner, since it has not reached m$_{max}$ (=3) yet, "NO" is determined at Step S5. In Step S6, the value of k is incremented by 1 to be "3". Thereafter, processing is returned to Step S3, and at every timing when k=3 when the phase of the AC electric signal is [ϕ$_0$+2π(k−1)/m$_{max}$], that is, [ϕ$_0$+4π/3]≅ϕ$_2$, the pulse laser light source 13 repeatedly irradiates the surface of the measurement object 11 with pulsed laser light, and each detection element of the image sensor 155 detects the intensity of the interference light (Step S4). Thus, as illustrated in FIG. 4 (c), a relationship between the phase shift amount by the phase shifter 153 and the intensity of the interference light when the phase of the AC electric signal is ϕ$_2$ is obtained.

Thereafter, since the value of k is 3 and has reached m$_{max}$, "YES" is determined in Step S5, and processing proceeds to Step S7. In Step S7, transmission of the AC electric signal from the measurement control unit 22 to the piezoelectric element 12 is stopped and as a result, vibration of the piezoelectric element 12 is stopped.

Next, in Step S8, a vibration state (amplitude and phase) of the physical quantity at each point of the measurement region is obtained.

First, for each detection element of the image sensor 155, each of the maximum output phase shift amounts $\delta\phi_0$, $\delta\phi_1$, and $\delta\phi_2$ at each of which an output of the detection element becomes the maximum is obtained while varying the shift amount by the phase shifter 153 at each of phases of $\phi_0$, $\phi_1$, and $\phi_2$ of vibrations (see graphs of FIGS. 4(a) to 4(c)). Further, the differences ($\delta\phi_1-\delta\phi_0$), ($\delta\phi_2-\delta\phi_1$), and ($\delta\phi_0-\delta\phi_2$) of the maximum output phase shift amounts with different phases of vibration are obtained. The differences between these three maximum output phase shift amounts represent relative displacements of the points A and B in the out-of-plane direction with three sets of two pieces of data in which the phases of vibration of a vibrator 12 are different (that is, the time is different) (Step S8).

Figure 5:
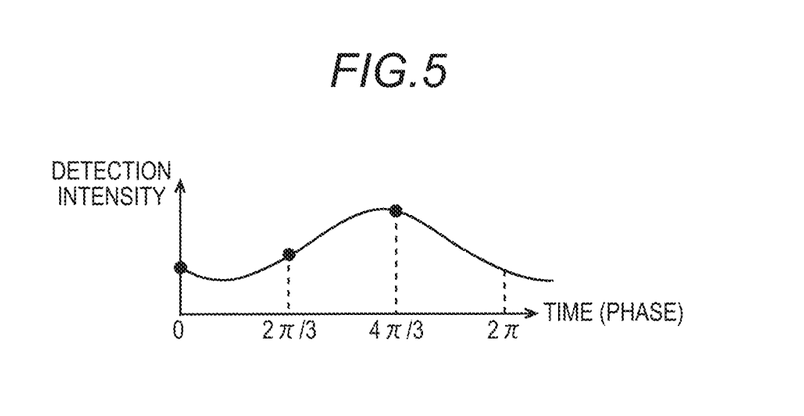
FIG. 5 is a diagram for explaining a periodic function acquired in the present embodiment.

When the relative displacement of the point A and the point B in the out-of-plane direction at each point on a surface of a sample at three time points with different phases (time) is obtained in Step S8, the periodic function acquisition unit 23 obtains the periodic function representing fluctuation of the physical quantity at each point of the sample (Step S9). When the relative displacement (value of the black circle in FIG. 5) of the point A and the point B in the out-of-plane direction at each point on the surface of the sample is obtained, as illustrated in FIG. 5, the periodic fluctuation of the physical quantity at each point can be represented by a mathematical expression by using a fluctuation period T of the physical quantity excited by the piezoelectric element.

When a function representing the physical quantity at each point on the surface of the sample is obtained by the periodic function acquisition unit 23, the physical quantity calculation unit 24 reads phase interval information stored in the storage unit 21, and calculates an intensity value of the sound wave at the phase interval from the periodic function. In the present embodiment, intensity values of the physical quantity at 60 different phases from one period are calculated on the basis of the phase interval information (information for obtaining intensities of the physical quantity different in phase by $\pi/30$) (Step S10).

Subsequently, the visualization unit creates a video by arranging the 60 intensity values of the physical quantity at each point on the surface of the sample obtained in Step S10 in order of phase (Step S11). Specifically, a total of 60 images, which are created by converting values of the physical quantity at each point on the surface of the sample at each phase time into luminance (shade) and color, are arranged in order of phase time. By displaying the arranged images at 20 fps, the video displaying the propagation state of sound waves of one period in 3 seconds is obtained. Here, a frame rate is equal to or greater than the frame rate (20 fps) of the video that can be recognized naturally as a moving picture by a human being. With this configuration, a sound wave propagation video that can be ascertained as a natural moving picture (video) can be obtained.

Figure 6:
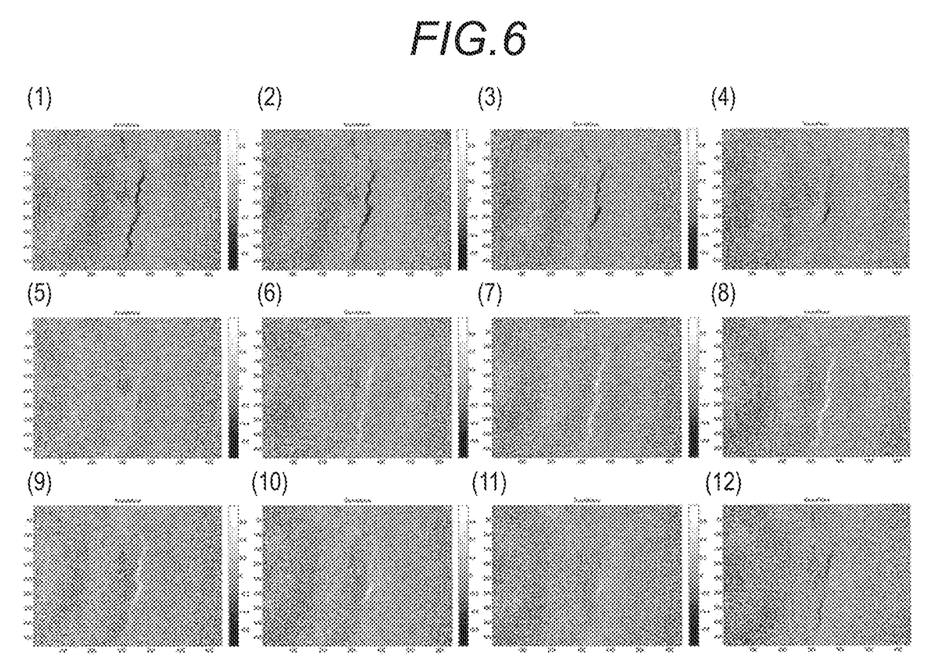
FIG. 6 is an example of images created on the basis of measured values of physical quantities in the present embodiment.
Figure 7:
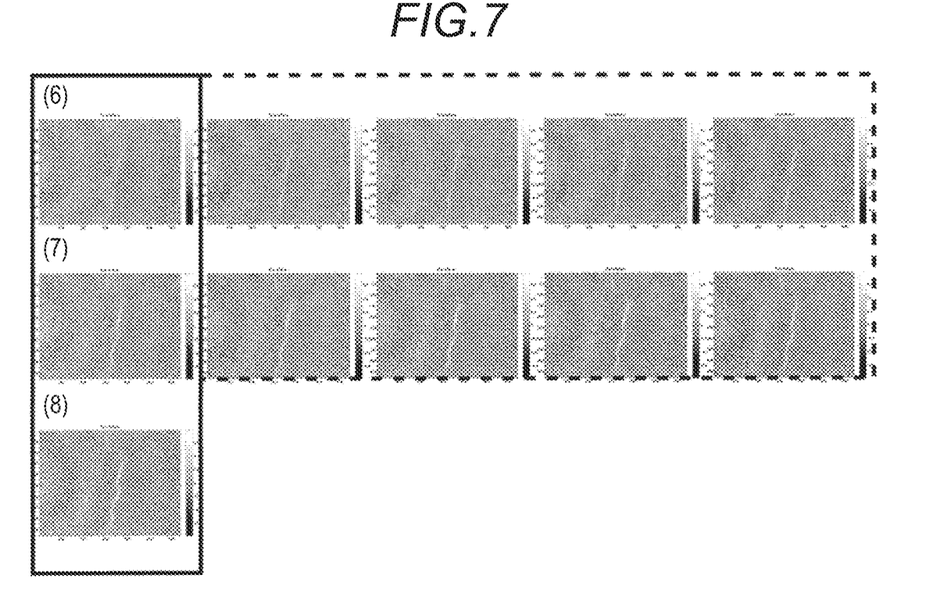
FIG. 7 is an example of images constituting a sound wave propagation video in the present embodiment.

The sound wave propagation image created by the sound-wave-propagation visualization device and method according to the present embodiment will be described with reference to FIGS. 6 and 7. FIG. 6 illustrates images created on the basis of the results of measuring the physical quantities in the measurement region (visual field of the image sensor) on the surface of the material at twelve different phase times. On the other hand, FIG. 7 illustrates a part of the images obtained by calculating the values of the physical quantity at 60 equidistant phase times, on the basis of the periodic function expressing the fluctuation of the physical quantity at each position of the measurement region from the measurement results at twelve different phase times illustrated in FIG. 6. In FIG. 7, three images enclosed by the solid line are (6), (7) and (8) in FIG. 6, and images enclosed by the broken line are images complemented by four images each between them. When the sound-wave-propagation visualization device of the present embodiment is used, as described above, it is possible to complement an arbitrary number of images during the phase time of the image obtained on the basis of actual measurement and to create a sound wave propagation image with continuity by arranging the images in order of phase time and repeatedly displaying the images.

By visually recognizing a region where the propagation of sound wave is discontinuous in the sound wave propagation image thus obtained, it is possible to easily find a defect or the like on the surface of the object to be measured. Alternatively, a configuration in which the defect or the like on the surface of the object to be measured is analyzed using algorithm for analyzing the moving picture and extracting the discontinuous point may be adopted.

Figure 8:
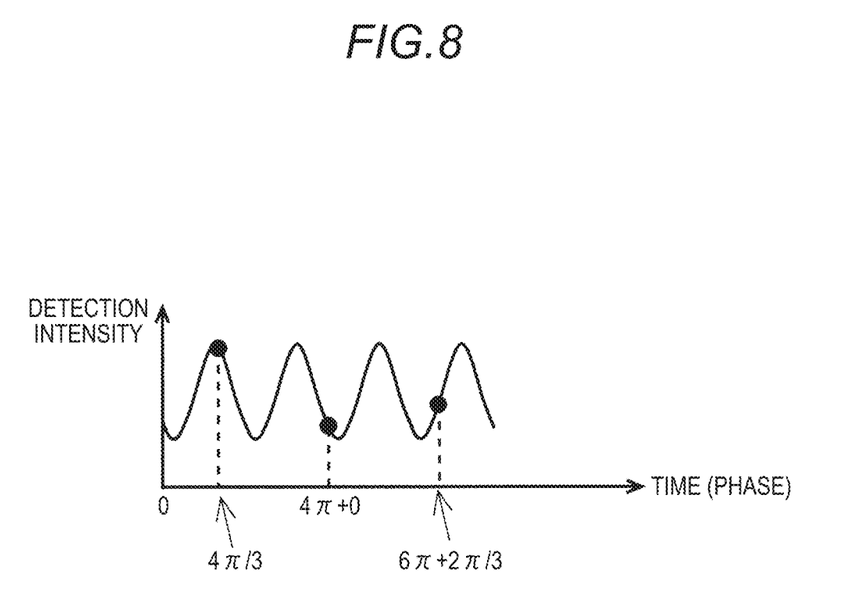
FIG. 8 is a diagram for explaining timing of measuring the physical quantity in the present embodiment.

As described above, in the sound-wave-propagation visualization device and method according to the present embodiment, a sound wave having a time waveform is represented by a continuous periodic function is applied to a prescribed position (for example, an end portion) on the surface of the object to be measured. As the sound wave propagates through the surface of the object to be measured, the periodic fluctuation of the physical quantity occurs. The physical quantities at each point on the surface of the sample at at least three time points with different phase times are collectively measured by an optical method. In the present embodiment, since the physical quantity fluctuates periodically at each position on the surface of the sample, it is not necessary to perform these three measurements during one period, and measurements can be performed three times with different phases (for example, three times in four periods) during plural periods (FIG. 8). For that reason, even in a case where the frequency and the propagation speed are large, the physical quantity can be reliably measured. In addition, it is possible to collectively measure the physical quantities at each point on the surface of the sample in a short time.

Then, the periodic function expressing the fluctuation of the physical quantity at each position on the surface of the object is obtained from the values of the physical quantity at the three different phase times obtained by the measurement. Subsequently, the values of the physical quantity at each point on the surface of the sample are obtained at desired phase intervals, and one image is created from the values of each point in the same phase. At this time, it is possible to obtain a plurality of images representing the finely varying physical quantity by setting a sufficiently fine phase interval. A smooth sound wave propagation video can be obtained by displaying a plurality of images thus obtained at a frame rate or higher (for example, 20 fps) that can be recognized as a moving picture by a human being.

The present invention is not limited to the present embodiment described above.

In the present embodiment described above, although the values of physical quantities are measured at three different phases, depending on the state of the surface of the object, even if the sound wave represented by one sine wave is applied by the piezoelectric element, a harmonic wave may be generated in a process of propagation. A sound wave including a harmonic wave component may be applied by the piezoelectric element, and in this case, the harmonic wave component is also included in the fluctuation of the physical quantity on the surface of the sample. In the example described above, although it is set that $m_{max}=3$, by choosing $m_{max}$ larger than the number represented by [2n+1] (n is a natural number of 2 or more), it is possible to detect up to an n-th order component (n-th harmonic component) of the fluctuation of the physical quantity excited in an object S to be inspected. That is, since (2n+1) or more sets of relative displacements of the points A and B in the out-of-plane direction are obtained, (2n+1) parameter values of amplitude of a fundamental wave, a phase of the fundamental wave, amplitude of the second harmonic, a phase of the second harmonic, . . . , amplitude of an n-th harmonic, a phase of the n-th harmonic, and a DC component of the fluctuation of the physical quantity are obtained. The configuration in which the sound wave including the harmonic component is applied in this way can be preferably used in a case of detecting a defective portion such as a cavity inside the object. That is, by applying sound waves of a plurality of frequencies, it is possible to detect a cavity having a resonance frequency in the vicinity of the frequency.

In the present embodiment described above, although a configuration in which the surface of the sample is illuminated using pulsed laser light, that is, a configuration in which a so-called stroboscope is used is adopted, a configuration in which the surface of the sample is illuminated at a predetermined timing by combining continuous illumination and the shutter may be adopted. Further, in a case where the fluctuation period of the physical quantity is sufficiently longer than a sampling rate of a sensor of optical displacement measurement device and the physical quantity can be measured for each phase by ordinary measurement, continuous illumination can be used.

In the present embodiment described above, although the values of the physical quantity at each point on the surface of the sample are measured by the measurement unit provided with the differential interference speckle imaging optical system, the physical quantity may be measured by another method. For example, as a method for optically measuring the physical quantity similarly as in the embodiment described above, there are a holographic interference measurement method, a grid projection method (Non-patent document 2), a sampling moire method (Non-patent document 3), a digital image correlation (DIC) method, a measurement method with a laser Doppler vibrometer, or the like can be used. Although it is limited to a transparent sample, a refractive index of the sample can also be measured by the holographic interferometric measurement method. Furthermore, as a method other than the optical measurement method, a method of measuring sound pressure with a microphone or a piezoelectric element or the like can be used. In this case, a plurality of detection elements (microphones or piezoelectric elements) are disposed at each point on the surface of the sample or each point on the surface of the sample is measured while being spatially scanned.

The invention claimed is:

1. A defect inspection device comprising:
   a sound wave excitation unit for exciting a sound wave having a time waveform represented by a continuous periodic function to a prescribed position on a surface of an object to be measured;
   a displacement amount measurement unit for measuring a periodically varying displacement amount of the surface generated by propagation of the sound wave from the prescribed position on the surface at at least three different phases of the periodic function of the sound wave excited by the sound wave excitation unit; and
   a periodic function acquisition unit for obtaining a periodic function expressing the periodic variation of the displacement amount on the basis of the displacement amount at the at least three different phases.

2. The defect inspection device according to claim 1, further comprising:
   a displacement amount calculation unit for obtaining values of displacement amount at each point on the surface at predetermined phase intervals by using the periodic function representing periodic variation in the displacement amount; and
   a visualization unit for visualizing the propagation of sound waves on the surface by using the values of the displacement amount obtained by the displacement amount calculation unit.

3. The defect inspection device according to claim 1, wherein phases at which the measurement by the displacement amount measurement unit is performed are 2n+1 (n is an integer of 2 or more) or more different phases and an n-th harmonic component of the periodically varying displacement amount is acquired.

4. The defect inspection device according to claim 1, wherein the displacement amount measurement unit includes illumination means for illuminating the surface of the object to be measured at a timing synchronized with the period of the sound wave.

5. The defect inspection device according to claim 1, wherein the displacement amount measurement unit includes an interference optical system that divides light from the surface of the object to be measured into two light beams, gives a phase difference between the two light beams, and then allows two light beams to be interfered with each other.

6. The defect inspection device according to claim 1, wherein at least three different phases at which the measurement by the displacement amount measurement unit is performed are set over a plurality of periods of the periodic function of the sound wave excited by the sound wave excitation unit.

7. A defect inspection method comprising:
   exciting a sound wave having a time waveform represented by a continuous periodic function to a prescribed position on a surface of an object to be measured;
   measuring a periodically varying displacement amount on the surface generated by propagation of the sound wave from the prescribed position through the surface at at least three different phases of the periodic function of the sound wave;
   obtaining a periodic function expressing a periodic variation of the displacement amount on the basis of the displacement amount at the at least three different phases;
   obtaining values of the displacement amount at each point on the surface at predetermined phase intervals by using the periodic function representing periodic variation in the displacement amount; and
   visualizing the propagation of sound waves on the surface by using the values of the displacement amount at each point on the surface obtained at the predetermined phase intervals to inspect the defect of the object.

8. The defect inspection method according to claim 7, wherein the at least three different phases are set over a plurality of periods of the periodic function of the sound wave.

* * * * *